United States Patent [19]

Hansen

[11] 4,245,767

[45] Jan. 20, 1981

[54] APPARATUS FOR EFFECTING MULTI-BEAD WELDING OF TWO WORKPIECES

[75] Inventor: Erik Hansen, Gentofte, Denmark

[73] Assignee: Burmeister & Wain A/S, Copenhagen, Denmark

[21] Appl. No.: 30,437

[22] Filed: Apr. 16, 1979

[30] Foreign Application Priority Data

Dec. 19, 1978 [DK] Denmark .............................. 5700/78

[51] Int. Cl.³ .......................................... B23K 9/12
[52] U.S. Cl. ....................................... 228/27; 228/41; 228/48; 228/9; 219/60 R
[58] Field of Search ................. 228/27, 41, 48, 9, 225, 228/244; 219/60 R, 61, 125.11, 125.12

[56] References Cited

U.S. PATENT DOCUMENTS

| | | | |
|---|---|---|---|
| 4,086,690 | 5/1978 | Bernasconi | 228/48 X |
| 4,175,227 | 11/1979 | Kasper | 219/125.12 |

FOREIGN PATENT DOCUMENTS

| | | | |
|---|---|---|---|
| 52-34013 | 9/1977 | Japan | 219/125.12 |
| 52-46902 | 11/1977 | Japan | 219/125.12 |
| 53-19459 | 6/1978 | Japan | 219/125.12 |
| 1205208 | 9/1970 | United Kingdom | |

*Primary Examiner*—Kenneth J. Ramsey

[57] ABSTRACT

An apparatus for multi-bead welding of two rotating workpieces with a welding seam, which is deep relative to the maximum radius of the workpieces, includes a flat filler wire holder which can be inserted into the gap between the workpieces and which is periodically pivoted forth and back about an axis which at the beginning of the welding operation is located within the gap. The holder may be angled and comprise a first limb extending generally perpendicular to the axis of rotation of the workpieces and which holds the filler wire, and a second limb extending out of the gap in the direction of the pivot axis. A pipe for supplying welding powder or protective gas may be mounted on the holder parallel to the second limb thereof. At its inner end the pipe may carry a sensor which controls the outward movement of the holder during the welding operation.

4 Claims, 5 Drawing Figures

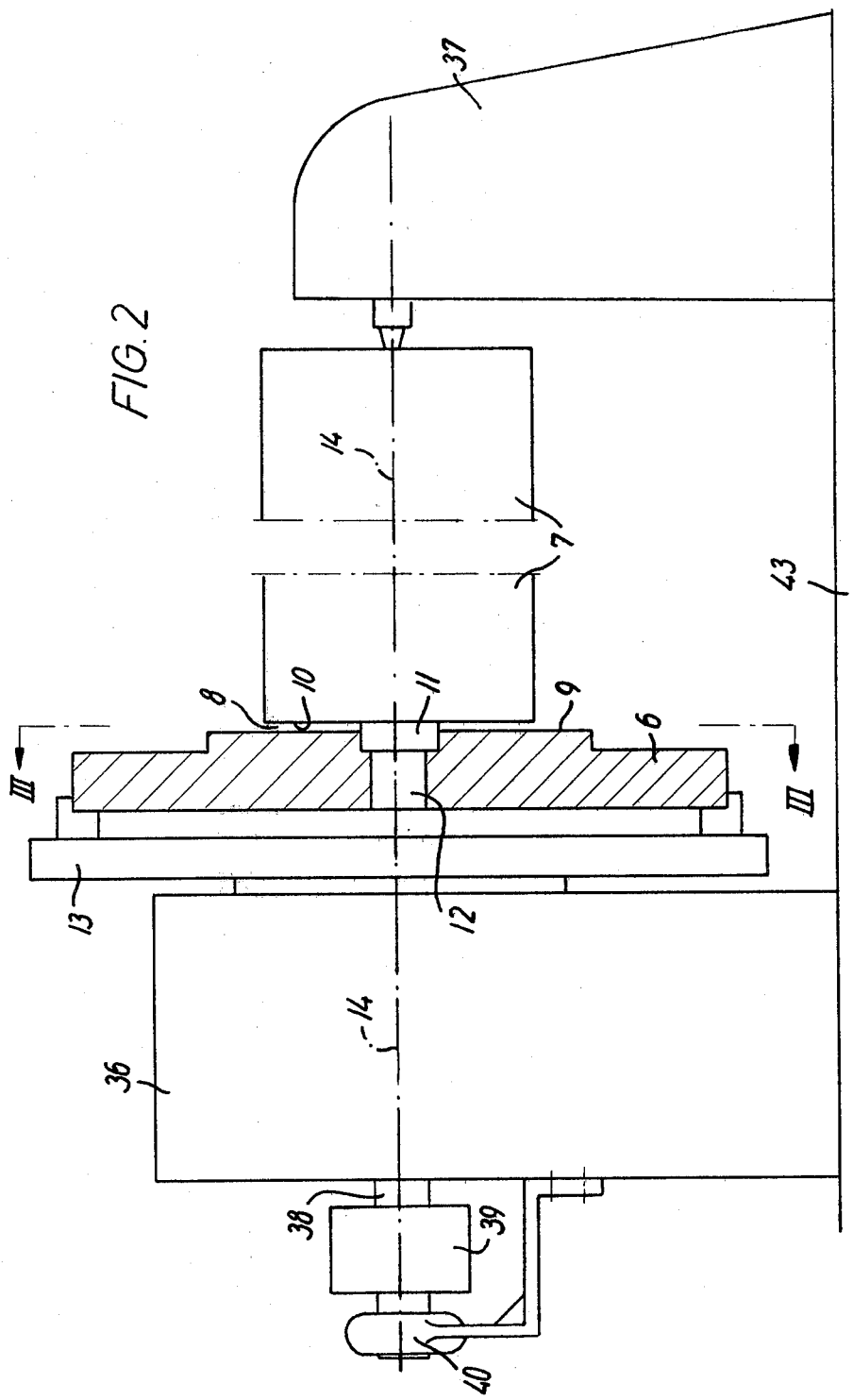

APPARATUS FOR EFFECTING MULTI-BEAD WELDING OF TWO WORKPIECES

BACKGROUND OF THE INVENTION

The present invention relates to a method of multi-bead welding two workpieces which are caused to rotate about a common center line while a holder for a filler wire is periodically pivoted forth and back between one and the other side of the gap defined between opposed end faces of the workpieces.

A method of this kind is known for welding workpieces, e.g. for a turbine rotor, in which the width of the welding seam requires filling-up by two juxtaposed welding beads. In response to the periodic pivoting of the holder and the filler wire the width of the seam is filled up by overlapping beads deposited alternately in the right and left side of the seam. In the known method the holder with the filler wire is pivoted forth and back about an axis located outside the largest diameter of the weld.

SUMMARY OF THE INVENTION

According to the present invention there is provided a method of a multi-bead welding of two workpieces, comprising supporting said workpieces, for rotation about a common center line and such that a gap is defined between opposed end faces of said workpieces, causing said workpieces to rotate in unison about said common center line, introducing a holder for a filler wire into said gap, mechanically advancing a filler wire through said holder into said gap, and simultaneously pivoting said holder together with said filler wire forth and back between one and the other side of said gap about an axis, the distance of which from the center line, at the beginning of the welding operation, is less than the largest radius of the two end faces of the workpieces.

With this method it is obtained that the annular movement of the holder and hence of the filler wire between its two extreme positions at the right and left side, respectively, of the gap between the workpieces, assuming a given width of the welding seam, can be considerably increased due to the shorter distance from the pivot axis to the welding position. In practice this has been found to result in an improved quality of the weld due to the larger inclination of the filler wire relative to the end face of the workpiece in question.

The invention also provides apparatus for carrying out the novel method which apparatus comprises means for supporting the two workpieces for rotation about a common center line and such that a gap is defined between the opposed end faces of said workpieces, means for rotating said workpieces in unison about said common center line, a holder for a filler wire and means for mechanically advancing a filler wire through said holder towards a welding position within said gap, means supporting said holder for pivoting about a transverse axis the distance of which from said welding position is less than the radial depth of said gap, and means for displacing said holder towards and away from said common center line.

If the holder together with the filler wire extends rectilinearly into the welding gap, the maximum angular deflection of the holder is obtained when its pivot axis is located approximately midway of the depth of the welding gap at the beginning of the welding operation, since the holder will then simultaneously collide with the end faces of both workpieces, inwardly and outwardly of the pivot axis, respectively. It will be understood that such a collision should normally be avoided, in particular if the surface of the holder is live.

A still larger angular deflection can be obtained in a preferred embodiment of the invention in which the holder is angular and comprises a first limb which extends generally in radial direction from the pivot axis towards the center line, and a second limb extending outwardly along the pivot axis and secured at its outermost end to a pivot pin for the holder, while the means for advancing the filler wire is arranged separate from the holder, preferably at a fixed distance from the pivot axis.

That part of the holder, which is located outside the pivot axis, then effects only a small lateral movement corresponding to the width of the second holder limb as measured in the plane of the gap, and the pivot axis can therefore be positioned as deep in the gap as desirable for purely welding-technical reasons. The embodiment is therefore suitable for welding having relatively deep welding seams and also for workpieces which in the immediate vicinity of the seam have projecting parts with considerably larger swing than the radius of the end faces defining the seam. This applies e.g. to the welding of crankshafts in the main journals, possibly closely adjacent a crank arm, and to the welding of a large-diameter flange to a shaft end.

BRIEF DESCRIPTION OF THE DRAWINGS

The invention will now be described in more detail with reference to the schematic drawings in which FIG. 2 is an axial section through two different workpieces which can also be welded by the method of the invention, and which have been shown set up in a rather schematically shown apparatus embodying the invention.

DETAILED DESCRIPTION

Figure 1:
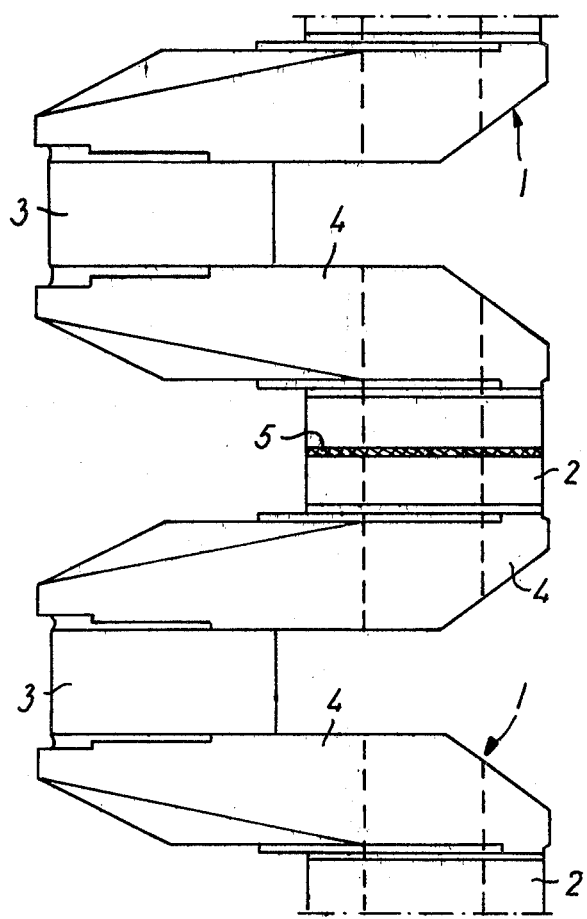
FIG. 1 shows two crank throws which have been welded together by the method of the invention.

FIG. 1 shows two crank throws 1 comprising main bearing journals 2, crank pins 3 and crank arms 4. The two throws have been welded together by means of a welding seam 5 located midway of the length of the common main journal 2. Before the welding is carried out, the workpieces may be temporarily joined and centered by means of a ring, not shown, which is tack-welded in the central bore of the journal and which may be removed after the welding operation, if desired. During the welding the two throws 1 rotate about the common center line of journals 2, and the welding can be carried out by means of an equipment which in principle corresponds to that illustrated in FIGS. 2-5 and described below.

FIG. 2 shows a flange 6 which is to be joined to a shaft 7 by means of a multi-bead welding in the relatively narrow and deep gap 8 between the opposed end faces 9 and 10 of the workpieces. Before being welded the workpieces are centered by means of a short stud 11 forming an extension of shaft 7, and the surface of which forms the bottom of gap 8. Stud 11 may be tack-welded into the central bore 12 of flange 6.

As shown in FIG. 2, flange 6 is clamped in a jaw chuck 13 secured to the main spindle of a headstock 36. Rotation of the main spindle is effected through a drive mechanism (not shown) enclosed within the headstock and preferably comprising an infinitely variable gear. The end of shaft 7 remote from flange 6 is supported by means of a tailstock 37, and if required the shaft may additionally be supported at one or more locations (not shown) intermediate its ends.

To the rear end of the main spindle there is secured a control shaft 38 which projects from the head-stock and which carries an actuator for a mechanism 39 (not shown in detail) for effecting the control of the welding process described below. The outermost end of shaft 38 extends through a housing 40 secured to the rear side of the headstock and containing contact means for supplying welding current through the shaft.

The components of the apparatus, which are employed for carrying out the welding operation proper, are mounted on a frame 41 which is displaceable along a bedplate 42 in the direction of the common center line and axis of rotation 14 of workpieces 6 and 7. This displacement of the frame serves for positioning the components relative to welding gap 8. Headstock 36 is secured to the bedplate 42 while tailstock 37 is displaceable thereon in the direction of center line 14.

A carriage 15 can move along frame 41 forth and back transversely of center line 14 outside the rotating workpieces, and the carriage is provided with guide means 16 for a vertically reciprocable slide 17. At its lower end slide 17 carries a bearing 18 for a holder 35 which by means of a mechanism (not shown in detail) can effect a limited pivoting movement about a horizontal axis 20 relative to bearing 18.

Figure 5:
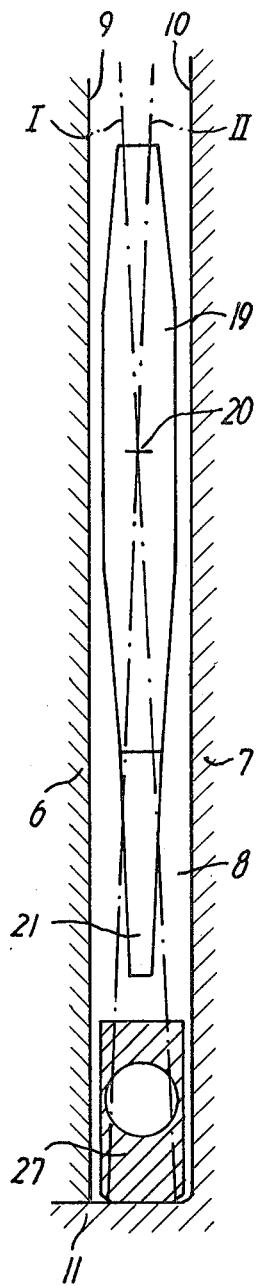
FIG. 5 is a section along line V—V of FIG. 4.
Figure 3:
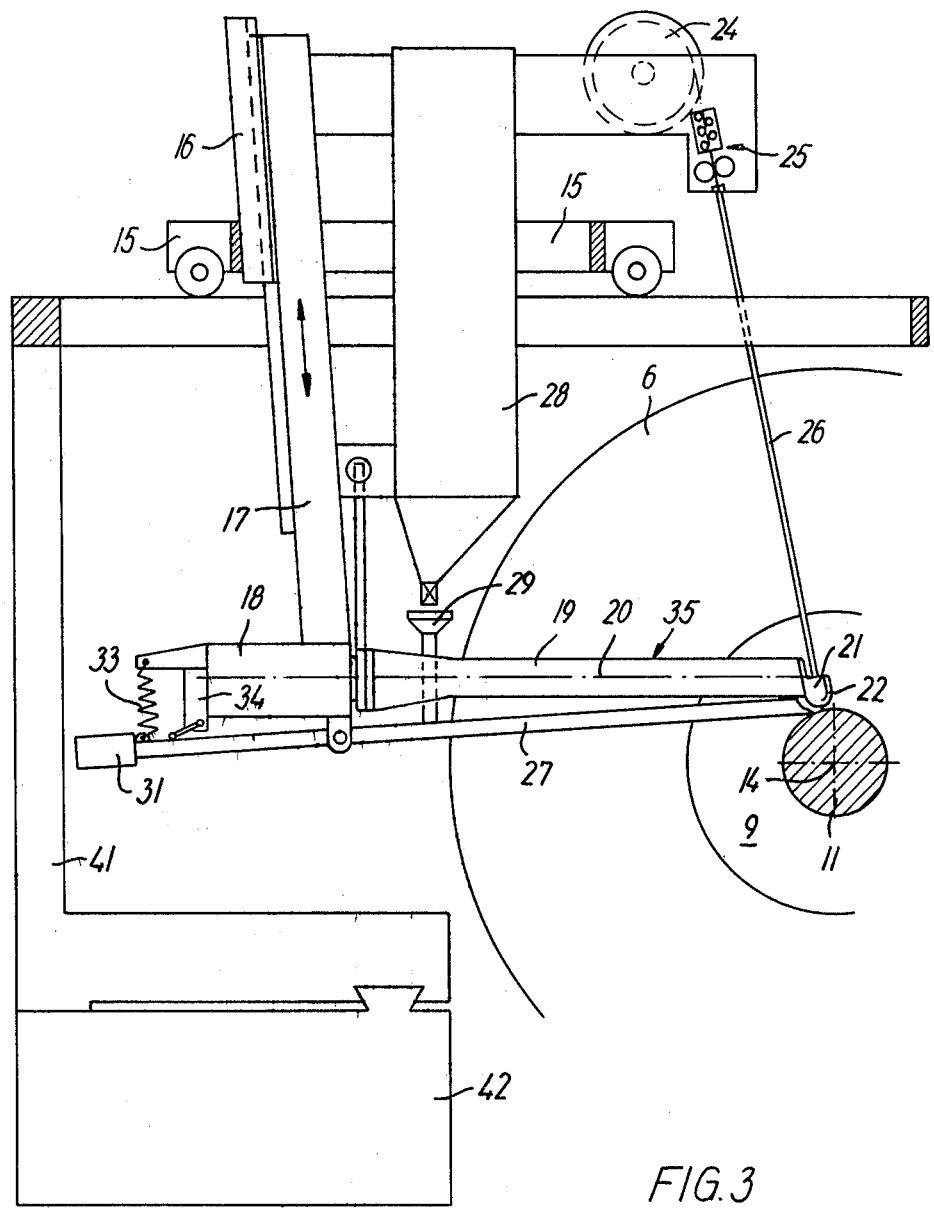
FIG. 3 is a section on a larger scale along line III—III of FIG. 2 with parts of the apparatus omitted for the sake of clarity.
Figure 4:
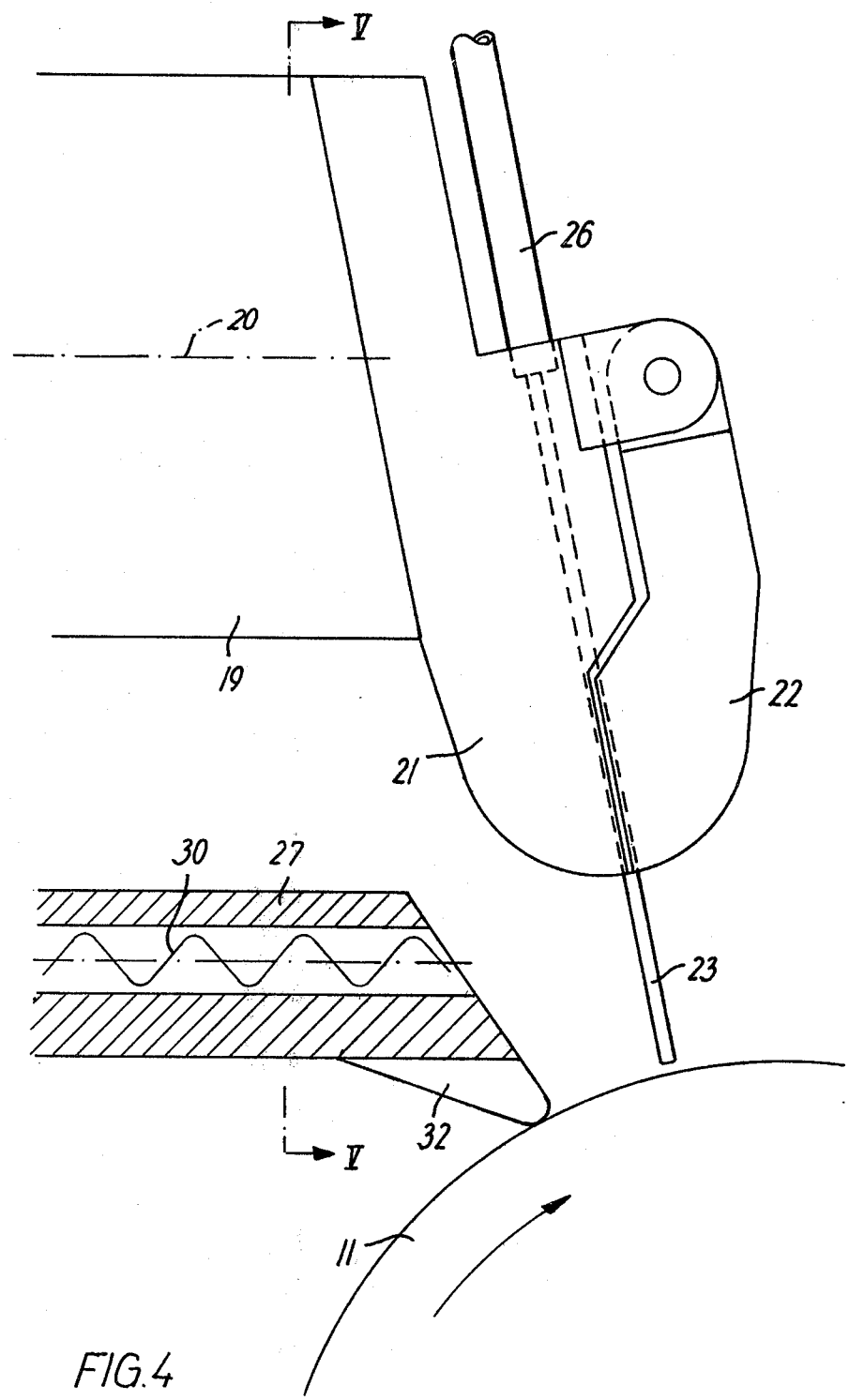
FIG. 4 is a fractional view on a still larger scale showing the welding position in FIG. 3.

Holder 35 is formed with a limb 19 extending from bearing 18 into welding gap 8 in the direction of pivot axis 20, and at least the front end of limb 19, which at the beginning of the welding operation as shown in FIGS. 3–5 is located entirely within the gap, has such transverse dimensions that it can pivot between the two end positions I and II as shown in FIG. 5 without colliding with the two end faces 9 and 10. The front end of limb 19 continues in a fixed jaw 21, which extends by and large radially towards center line 14 and which in cooperation with a movable and spring loaded jaw 22 can grip a filler wire 23 which is advanced from a supply spool 24 on slide 17 by means of a suitable feeding mechanism 25. Between the feeding mechanism and the jaws 21, 22 the filler wire is guided in a tube 26 which at its upper end is connected rigidly with the feeding mechanism while its lower end extends with clearance into a bore in the fixed jaw 21 so that the above-mentioned pivoting of the jaw about axis 20 is not prevented.

Below limb 19 of holder 35 a pipe 27 for feeding welding powder is hinged to bearing 18 about an axis parallel to center line 14, and welding powder is supplied from a receptacle 28 on slide 17 through a hopper 29 to the interior of pipe 27 where it is fed to the welding position by means of an auger 30 driven from a motor 31 on the rear end of pipe 27.

By a suitable choice of welding powder it can be ensured, as well-known within the art of submerged arc welding, that the welding cinder formed comes loose of itself from the welding bead and drops out of the welding gap during the rotation of the workpieces. If a protective gas is employed rather than welding powder, the gas can be supplied through a similar pipe without an auger therein.

On the front end of pipe 27 there is mounted a sensor 32 which under the influence of a spring 33 acting on the rear end of pipe 27 is kept in engagement with the surface of stud 11 before the welding operation commences and subsequently with the surface of the successively growing weld. The rear end of pipe 27 actuates a switch 34 which controls the upward movement of slide 17 in timed relationship with the progress of the welding operation.

The previously mentioned periodical pivoting of holder 35 together with jaws 21 and 22 between the two end positions I and II may be controlled by the previously mentioned mechanism 39 which is actuated from shaft 38 rotating in unison with the workpieces 6 and 7. The pivoting movement may for instance be controlled such that holder 35 is maintained in one of its end positions during one full revolution of the rotating workpieces so that a weld of 360° length is deposited in one bottom corner of gap 8. The holder is then pivoted to its opposite end position, preferably at a constant or approximately constant angular velocity, and when the holder has reached the other end position, it remains here during one full revolution of the workpieces.

It will be understood that in lieu of the angled holder 19, 21, 22 shown for the filler wire one could use a rectilinear, radially or substantially radially extending holder in such cases where the maximum radius of the two workpieces in the vicinity of the welding gap does not materially exceed the outer radius of the finished weld, e.g. for carrying out the weld 5 shown in FIG. 1 midway of the main journal of a crankshaft. On the other hand, the apparatus as described permits welding close to a shoulder of large radius or swing which e.g. in the manufacture of crankshafts permits welding of separately made crank arms, main journals and crank pins by means of welds located close to the fillets between the arms and the journals or the pins, respectively. Especially for making very large crankshafts this may be of advantage to the production. Also for making e.g. thrust shafts or welding flanges to shaft ends it is advantageous that a shaft can be welded directly to the flat surface of a disk-shaped workpiece having substantially larger diameter than the shaft.

I claim:

1. Apparatus for effecting a multi-bead welding of two workpieces in a gap between opposed, substantially parallel end faces of the workpieces, comprising:
   means for supporting said workpieces for a rotation about a common center line,
   means for rotating said workpieces in unison about said center line,
   a filler wire supply outside said gap and wire feed means for mechanically advancing a filler wire from said supply towards a welding position within said gap,
   a filler wire holder shaped as a thin arm extending into into said gap and supported at its rear end outside said gap in a bearing for pivoting about an axis perpendicular to said common center line, said pivot axis being located within the contour of the cross-section of said arm,
   wire gripping means on the forward end of said arm adjacent said welding position, means for displacing said bearing and the filler wire holder supported therein towards and away from said common center line, and a filler wire guide tube extending from said wire feed means toward said wire gripping means, said guide tube being stationary relative to said bearing and extending at an angle to said pivot axis at its forward end adjacent said wire gripping means.

2. Apparatus as claimed in claim 1, wherein said bearing for supporting the filler wire holder, said wire supply and feed means, and said filler wire guide tube are mounted on a common slide which is displaceable towards and away from said common center line.

3. Apparatus as claimed in claim 1, further comprising a pipe extending parallel to and below said filler wire holder towards said welding position for supplying welding powder to said welding position.

4. Apparatus as claimed in claim 3, further comprising a sensor for controlling said displacement of said holder away from said common center line, which sensor is provided on the front end of said pipe.

* * * * *